United States Patent [19]
Layton et al.

[11] Patent Number: 6,034,491
[45] Date of Patent: Mar. 7, 2000

[54] UNIVERSAL FIXTURE HAVING SHARED DRIVE ASSEMBLY

[75] Inventors: David J. Layton, Centerville, Utah; Stephen L. Sembritzky, Puyallup; David M. Kozy, Kent, both of Wash.

[73] Assignee: The Boeing Company, Seattle, Wash.

[21] Appl. No.: 09/109,001

[22] Filed: Jul. 1, 1998

Related U.S. Application Data

[60] Provisional application No. 60/060,629, Oct. 1, 1997.

[51] Int. Cl.[7] .............................. H02K 7/14; B23Q 5/10; B23Q 7/00
[52] U.S. Cl. .............................. 318/4; 318/562; 318/570; 318/625; 318/39; 29/559; 29/281.1; 33/560; 33/561.1; 702/152
[58] Field of Search ...................... 702/150–153; 33/560, 561.1–561.3; 318/3, 4, 562, 570–574, 625, 39, 98; 364/468.03, 468.15–468.17, 474.03; 29/428–431, 559, 33 P, 56.6, 705, 760, 281.1–281.4

[56] References Cited

U.S. PATENT DOCUMENTS

| | | | |
|---|---|---|---|
| 4,043,044 | 8/1977 | Whitehead et al. | 33/552 |
| 4,257,103 | 3/1981 | Suzuki et al. | 318/562 X |
| 4,400,884 | 8/1983 | Baresh et al. | 33/552 |
| 4,624,236 | 11/1986 | Gile et al. | 125/11.01 |
| 4,781,517 | 11/1988 | Pearce et al. . | |
| 4,805,314 | 2/1989 | Hayashi et al. | 33/503 |
| 4,821,408 | 4/1989 | Speller, Sr. et al. . | |
| 4,876,758 | 10/1989 | Rolloff et al. | 12/142 N |
| 4,890,235 | 12/1989 | Reger et al. . | |
| 4,970,800 | 11/1990 | Takizawa et al. . | |
| 4,998,354 | 3/1991 | Silverman et al. | 33/514.2 |
| 5,055,752 | 10/1991 | Leistensnider et al. | 318/570 |
| 5,163,333 | 11/1992 | Brubaker et al. | 73/865.8 |
| 5,220,718 | 6/1993 | Speller, Sr. et al. . | |
| 5,470,590 | 11/1995 | Brubaker et al. | 425/2 |
| 5,562,277 | 10/1996 | Swann et al. . | |
| 5,653,005 | 8/1997 | Speller, Sr. et al. . | |
| 5,726,350 | 3/1998 | Tsuruta | 73/105 |
| 5,747,676 | 5/1998 | Faust et al. | 73/105 |
| 5,767,649 | 6/1998 | Arimoto et al. | 318/570 |
| 5,822,877 | 10/1998 | Dai | 33/560 |
| 5,865,769 | 2/1999 | Case et al. | 600/587 |
| 5,883,313 | 3/1999 | Ercole et al. | 73/865.8 |

*Primary Examiner*—Brian Sircus
*Attorney, Agent, or Firm*—Lawrence W. Nelson

[57] ABSTRACT

The present invention relates to an automatically reconfigurable contour checking fixture for comparing a component to a programmed contour. The fixture comprises a horizontal support table, having a length and width, wherein a drive rack runs along its length. The fixture also includes a plurality of stations positioned at intervals along the length of the support table, each of the stations including an artificial template member, and a multi-service drive assembly which drives the artificial template member of each of the plurality of stations to a respective designated point along the programmed contour. A computer is in communication with the multi-service drive assembly, communicating positional instructions such that the artificial template member of each of the plurality of stations conforms to the programmed contour.

15 Claims, 11 Drawing Sheets

UNIVERSAL FIXTURE HAVING SHARED DRIVE ASSEMBLY

This application claims benefit for Provisional Application No. 60/060629 Oct. 1, 1997.

BACKGROUND OF THE INVENTION

1. Field of the Invention

The present invention relates to a universal fixture and, more particularly, is directed to an automatically driven universal fixture used to position or measure a component.

2. Background Information

Most modern machine shops that perform large-scale production operations are typically equipped with one or more universal fixtures. In the aerospace industry, for example, universal fixtures are used to support panels having specific contours. Such a fixture may consist of a matrix of adjustable nail-like supports protruding from a surface. Other forms of universal fixtures, such as disclosed in a patent to Speller, Sr., et al. (U.S. Pat. No. 4,821,408), are directed to a universal fixture for holding an assembly to be operated on by a numerically controlled ("NC") machining apparatus. The assembly may be a strip-type assembly, such as a wing webbing. Yet another form of universal fixture is a contour checking fixture 310, as shown in FIG. 1, which is used to measure the contour of a tolerance critical component 320, such as a stringer of an airplane wing.

In the contour checking fixture 310 of FIG. 1, the component 320 to be measured is positioned between a series of stations 322a–322g and a contour template 324, both of which are mounted on a floor check fixture 325. The actual contour of the component 320 is compared with the contour of the contour template 324, which represents the required contour and dimensions of the component 320.

The contour template 324 includes a series of thin aluminum sheets 326a–326d, each of which is carefully machined by an NC machining apparatus. Each of the sheets 326a–326d of the contour template 324 has one surface that precisely matches the required contour of the component as specified by engineering drawings. Each of the sheets 326a–326d is separately fastened to the floor check fixture 325.

The stations 322a–322g are positioned parallel to one another on the floor check fixture 325. Further, each of the stations 322a–322g includes respective plastic braces 332a–332g positioned perpendicular to the contour template 324 which press against the component 320 to push the component 320 toward the contour template 324. Each of the braces 332a–332g is moved into position and held there by respective pneumatically powered pistons 334a–334g movable within a respective pneumatic housing 336a–336g and powered by air supplied via pneumatic hoses 338. The braces 332a–332g are slidably coupled to their respective stands 335a–335g using at least two loose-fitting nut and bolt assemblies 331 (shown on brace 332a). When pushed by the pistons 334a–334g, the respective braces 332a–332g slide along tracks (not shown) within the stands 335a–335g.

When the component 320 is measured, any former contour template is removed piece by piece and stored. Then, the required contour template 324 is carefully fastened onto the floor check fixture 325. Next, each of the stations 322a–322g is slid along tracks 342a, 342b, etc., within the floor check fixture 325 assisted by rollers 44 until each of the stations 322a–322g has been positioned within an inch or so of the width of the component 320. The stations 322a–322g are then locked into position with a locking mechanism (not shown). Next, the component 320 is placed between the contour templates 324 and the braces 332 of each of the stations 322a–322g. Then, air is supplied by an air source 351 via the air hoses 338 to the pneumatic housings 336a–336g, causing the pneumatic rods 334a–334g to push a respective one of the plastic braces 332a–332g against the component 320 with a force of approximately 5 pounds. Once the component 320 is securely braced against the contour template 324, a feeler gauge is used by an inspector to take careful measurements between the actual component 320 and the contour template 324 to measure the component's deviation from the template. The measured deviations are used to determine whether the component is within acceptable tolerances. If the component 320 is within tolerance, it is removed and replaced by a similar component and the process is repeated. When a new component is measured, the contour template 324 is removed and replaced by another template corresponding to the required contour of the new component.

However, the process of replacing the contour template 324 can take a group of workers up to an hour. Thus, if seven different components each having different contours are measured within a day, seven hours of the day are used just to set up and break down the fixture for the measurements. This set-up and break-down process is not only time-consuming, but also extremely costly since skilled labor must perform this task. Also, it is easy to introduce error into the template 324 during its installation. Further, the contour template 324 can be bulky and heavy, and is potentially dangerous to swap out. Unfortunately, efforts to make the contour template 324 less bulky, i.e. putting holes 328 within the contour template 324, and making the aluminum very thin, have the drawback of making the contour template 324 weak and flimsy and potentially bendable during the measurement process. Once the contour template 324 has been damaged, a brand-new contour template must be built with an NC machining device at great cost. Finally, when not in use, the contour templates must be stored, requiring the use of expensive floor space within the factory.

Consequently, in the art of universal fixtures, especially where the fixtures are used to measure contours of components, there is a need for a device that will automatically set up a fixture for a component quickly, inexpensively, and without the need of a fixed template.

SUMMARY OF THE INVENTION

The present application claims priority from Provisional Application No. 60/060629, the contents of which are incorporated by reference herein.

In accordance with one aspect, the present invention relates to an automatically reconfigurable contour checking fixture for comparing a component to a programmed contour. The fixture comprises a support table, having a length and width, where a drive rack runs along its length. The fixture also comprises a plurality of stations positioned at intervals along the length of the support table. Each of the stations includes an artificial template member. The fixture further comprises a multi-service drive assembly which drives the artificial template member of each of the plurality of stations to a respective designated point along the programmed contour. The fixture also comprises a computer in communication with the multi-service drive assembly, communicating positional instructions such that the artificial template member of each of the plurality of stations conforms to the programmed contour.

In accordance with another aspect, the present invention relates to an automatically adjustable fixture comprising a plurality of movable members used to engage a component, a first drive mechanism which engages each of the plurality of movable members at a respective engageable portion and drives each of the movable members to a desired position, and a second drive mechanism which moves the first drive mechanism to a plurality of positions corresponding to the engageable portion of each of the plurality of movable members.

In accordance with yet another aspect, the present invention relates to an automatic universal fixture to position a component. The fixture comprises a plurality of clamping devices used to support the component at the position, each of the devices distinctly movable to a predetermined point in space. The fixture also comprises a frame used to mount each of the plurality of clamping devices relative to each other, a drive assembly used to move each of the plurality of clamping devices to the predetermined point in space, and a shuttle slidably mounted on the frame and supporting the single drive assembly to selectively move the single drive assembly relative to the frame and each of the plurality of clamping devices.

In accordance with another aspect, the present invention relates to an automatically adjustable fixture for holding a plurality of sub-components that form a component to be assembled. The fixture comprises a base stabilized at a designated position, and a plurality of movable positioning devices located at intervals along the base. Each of the positioning devices includes a holding device structured to hold at least one of the sub-components relative to at least one of another of the sub-components, while allowing the assembly of the component, and a drive interface. The fixture also comprises a drive assembly selectively engageable to each of the movable positioning devices to move the holding device to a predetermined position.

In accordance with yet another aspect, the present invention relates to a universal panel support fixture for supporting a variety of panels having different contours, shapes, and sizes. The fixture comprises a base having a length and width. The base is held stationary at a designated position. The fixture also comprises a plurality of movable positioning devices located at intervals along the length and the width of the base. Each of the positioning devices includes a support device adapted to firmly support and hold a portion of the panel in a predetermined position. Each of the plurality of movable positioning devices further includes a drive interface. The fixture further comprises a plurality of drive assemblies, each selectively engageable to groups of movable positioning devices for moving each of the positioning devices in each of the groups to a selected position. The fixture also includes a plurality of shuttles, each movable relative to a respective one of the groups of movable positioning devices, each of the shuttles supporting one of the plurality of drive assemblies and selectively moving the one of the drive assemblies to a position contiguous with the drive interface of one of the movable positioning devices.

BRIEF DESCRIPTION OF THE DRAWINGS

These and other features, aspects and advantages of the present invention will be better understood with regard to the following description, appended claims, and accompanying drawings. In the accompanying drawings, there is shown present preferred embodiments of the invention, wherein like-referenced numerals are employed to designate like parts, wherein:

DETAILED DESCRIPTION OF THE PREFERRED EMBODIMENTS

Figure 1:
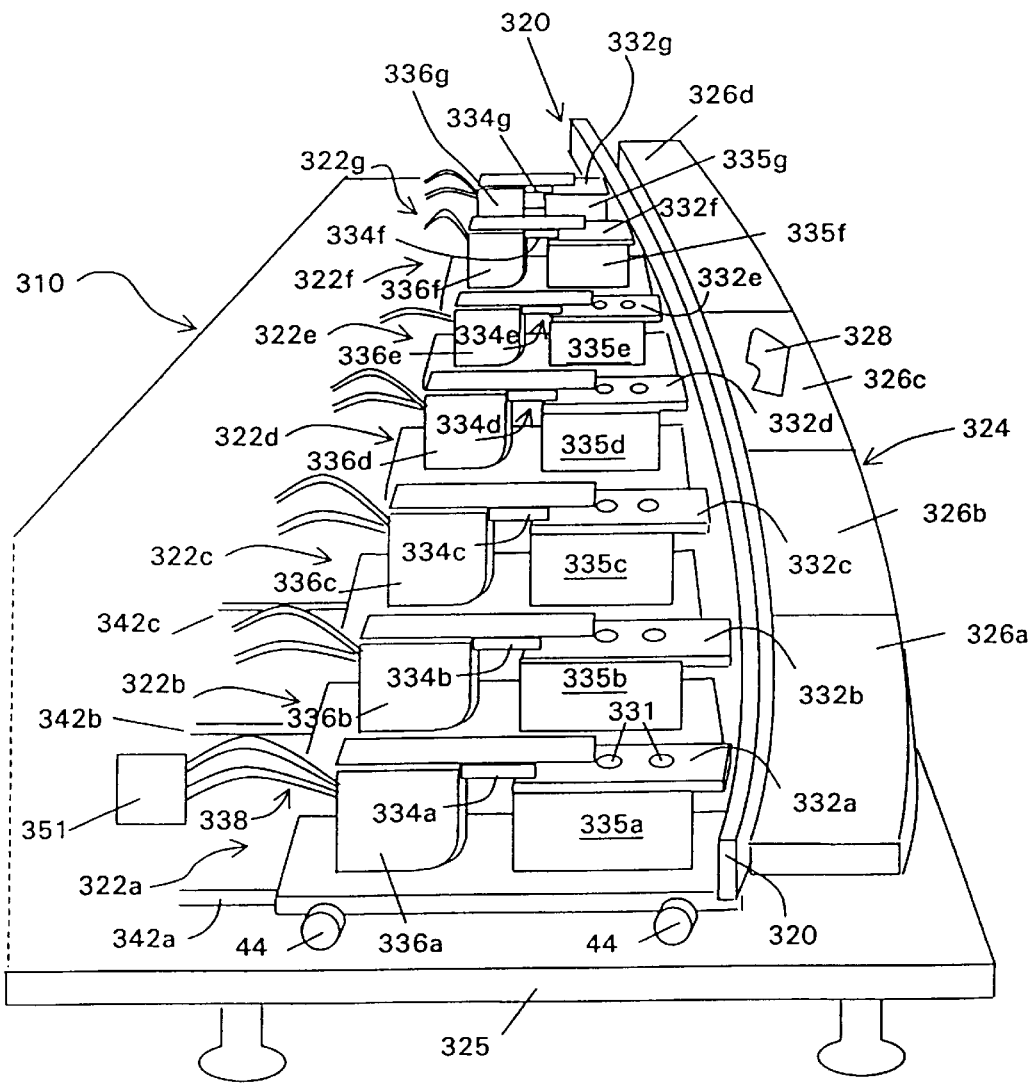
FIG. 1 is an isometric view of a prior art contour-checking fixture.
Figure 2:
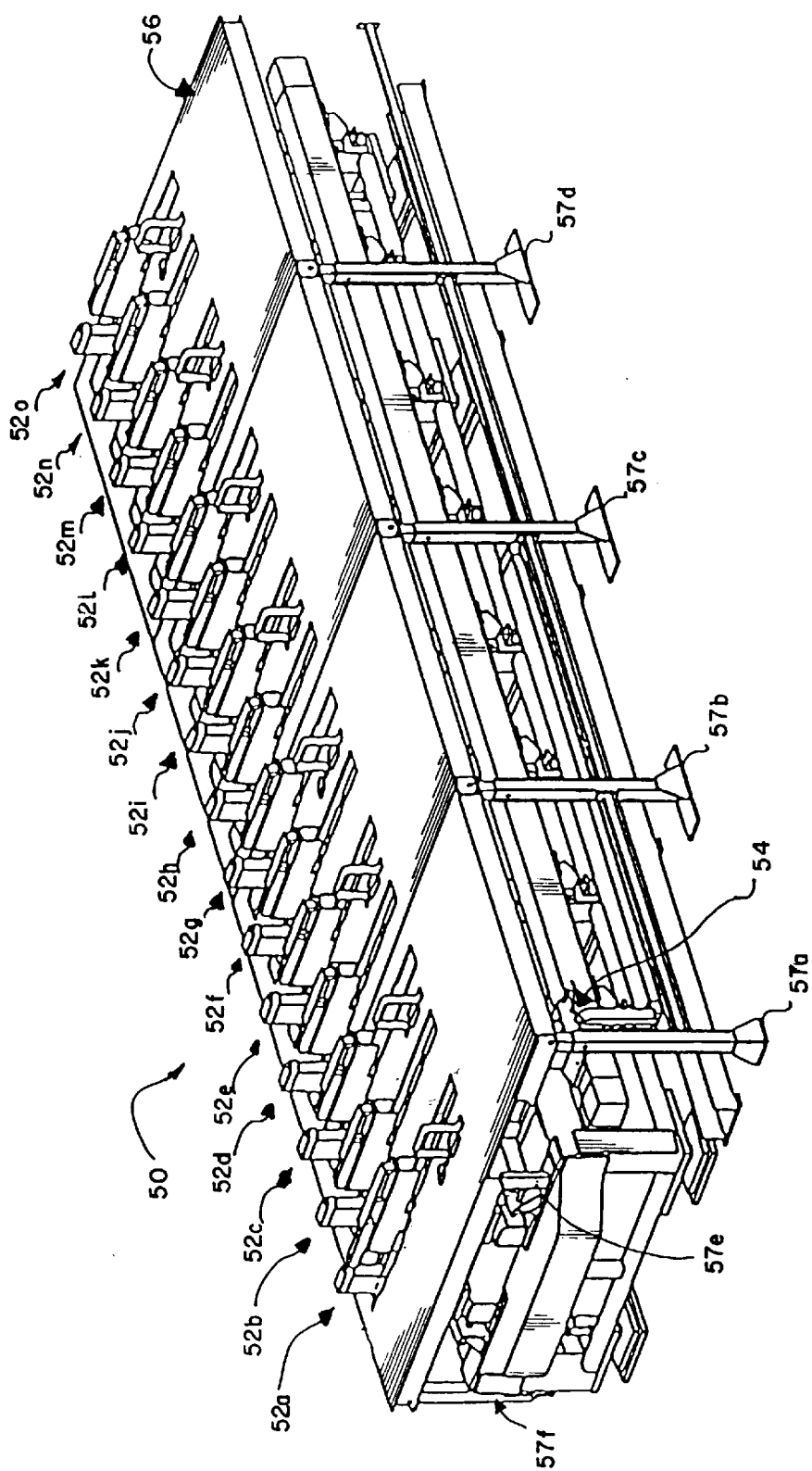
FIG. 2 is an isometric view of an automatically reconfigurable contour checking fixture having a shared drive assembly as a first embodiment of the present invention.

FIG. 2 refers to an automatic reconfigurable contour checking fixture 50, as a first embodiment of the present invention, having a plurality of stations 52a–52o and a drive assembly 54. Each of the stations 52a–52o is positioned according to a computer's 108 input to simulate a contour template from which a fixed component can be compared to determine if it meets required tolerances. The stations 52a–52o conform precisely to the dimensions designated by the computer 108, thereby eliminating any stacking of tolerances that occur when a machined template is used.

Each of the stations 52a–52o shares the common drive assembly 54. The stations 52a–52o are separately engaged and moved by the drive assembly 54 to a designated position determined by the computer 108 to accurately simulate the contour template. The use of the single drive assembly 54 significantly reduces the overall cost of building the fixture 50. Also, the use of the single drive assembly 54 reduces the weight of the fixture 50. Finally, less floor space is required by the checking fixture 50 and by any accompanying control enclosures when only the single drive assembly is used.

The checking fixture 50 can be quickly altered to accommodate a component with an entirely different contour, thus making a change of components quick and inexpensive. Speed can be increased by adding additional drive assemblies to reduce the ratio of stations to drive assemblies. The stations served by a drive assembly are then divided into modules. The fewer modules used for a fixed amount of stations, the lower the cost, while the more modules used for the same amount of stations, the faster the set-up time. The ratio of drive assemblies to stations is determined based on cost, desired set-up time, and available space on the production floor.

As shown in FIG. 2, when the fixture contour checking 50 is in use, a protective cover 56 having legs 57a–57f encloses a substantial portion of the stations 52a–52o and the drive assembly 54.

Figure 3:
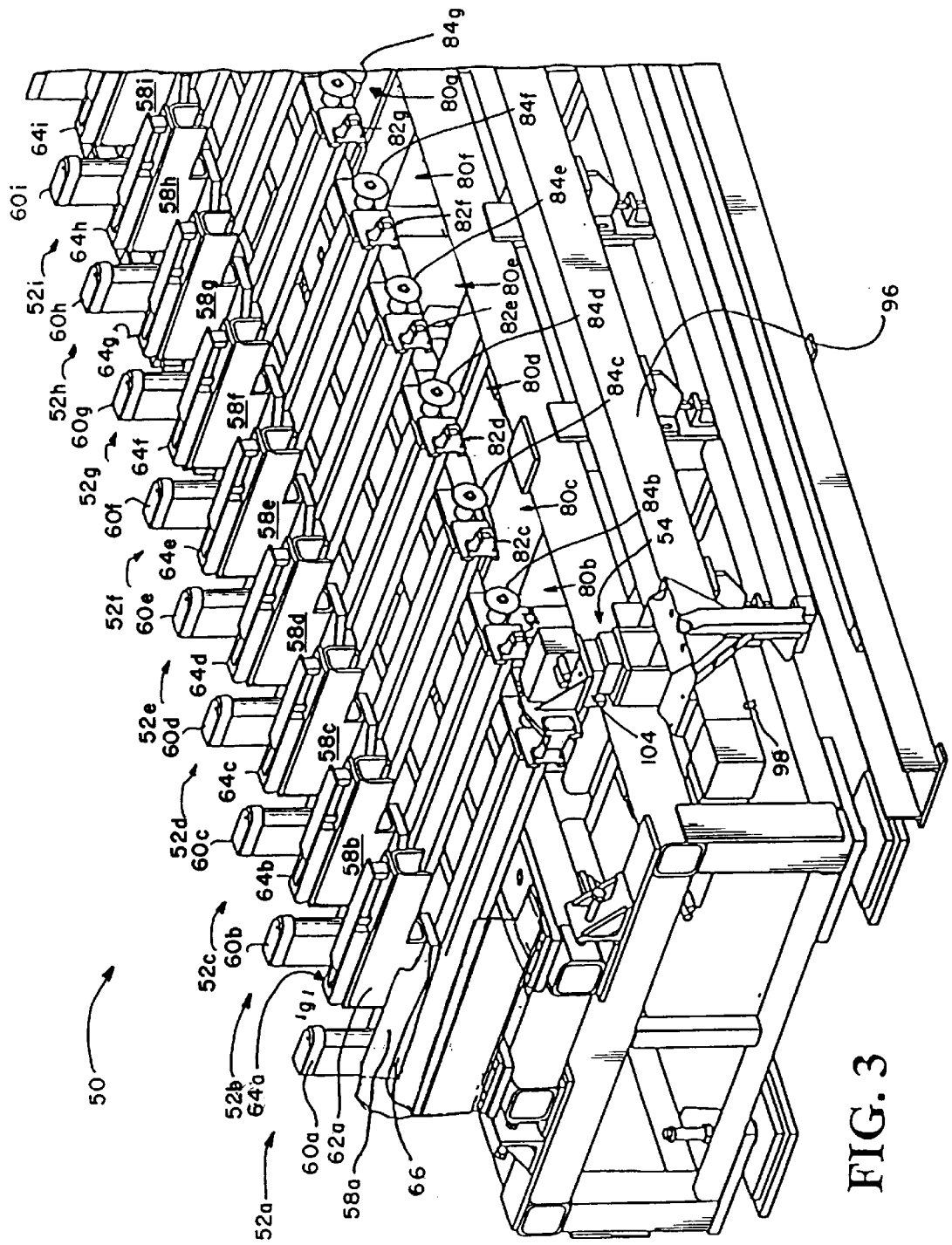
FIG. 3 is an expanded isometric view of the drive assembly, and plurality stations of the automatically reconfigurable contour checking fixture of the first embodiment.
Figure 4:
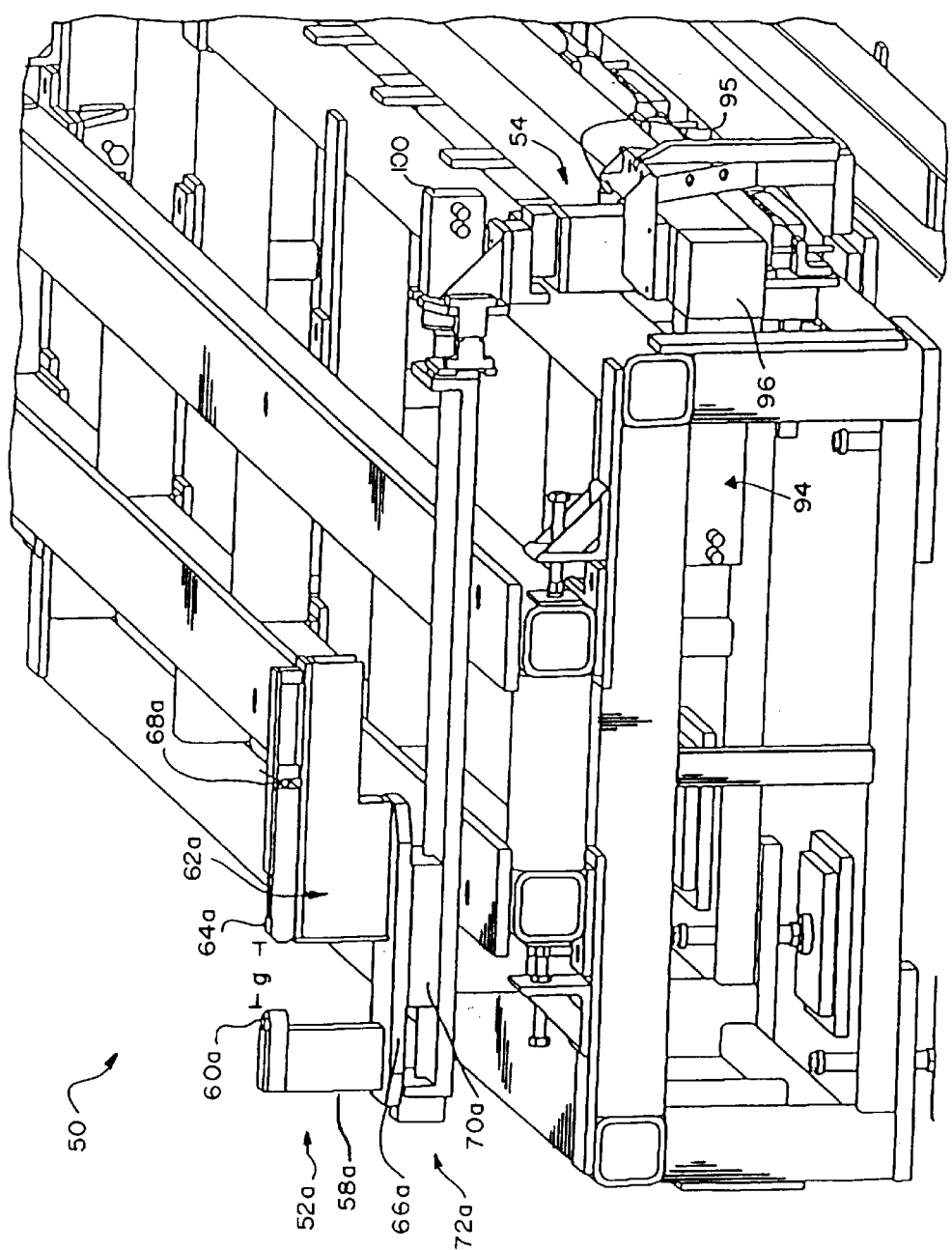
FIG. 4 is an expanded elevation view of one of the stations and of the drive assembly of the automatically reconfigurable contour checking fixture of the first embodiment.

FIG. 3 shows a close-up expanded elevation view of a portion of the contour checking fixture 50 without the cover 56. Referring to FIGS. 3 and 4, the stations 52a through 52o include respective movable members 58a–58o. The movable members 58a–58o have respective artificial template members 60a–60o, which substitute for the contour template in the prior art. Gaps between each of the artificial template members 60a–60o and respective portions of a component inserted within the checking fixture 50 are measured to determine whether the component deviates from design requirements beyond acceptable tolerances. The movable members 58a–58o also include respective pressure members 62a–62o having pneumatic slides 64a–64o that are powered by air pressure from air hoses (not shown). When activated, the pneumatic slides 64a–64o extend out toward their respective artificial template members 60a–60o, making contact with the component that is inserted within space "g" of the movable members 58a–58o. A force of at least five pounds is placed upon the component to force it as close as possible to the artificial template members 60a–60o.

FIG. 4 shows only the station 52a having a movable member 58a, which has a common base 66a shared by the artificial template member 60a and the pressure member 62a. The base 66a keeps the artificial template member 60a a fixed distance "g" from the pneumatic slide 64a when in its retracted position. The pneumatic slide 64a is pushed out toward the artificial template 60a by a pneumatic cylinder 68a, as shown in FIG. 4. The base 66a of the movable member 58a is mounted on a positioning table 72a.

Figure 5:
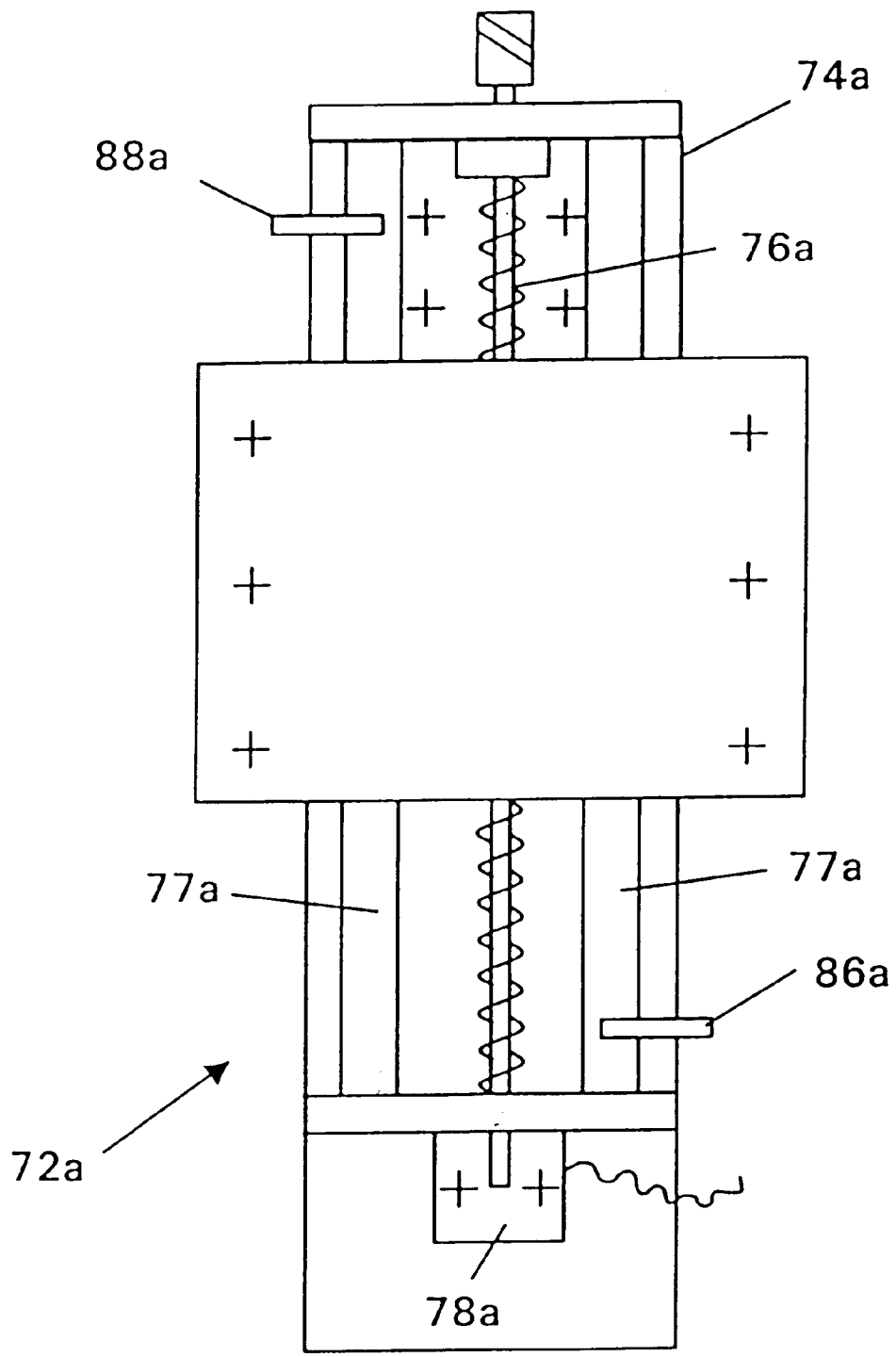
FIG. 5 is a plan view of a positioning table of one of the stations of the automatically reconfigurable contour checking fixture of the first embodiment.

The positioning tables 72a–72o are preferably LIN-TECH® tables, Part No. 43557. Each of the tables 72a–72o includes the same components as the positioning table 72a, shown in FIG. 5. The positioning table 72a has a carriage 70a, which is coupled to the base 66a. The table 72a also has a housing structure 74a, and a threaded rod 76a. The carriage 70a includes an engagement member (not shown), such as a nut assembly on the side facing the threaded rod 76a. The nut assembly threadingly engages the threaded rod 76a. The carriage 70a moves along slides 77a when the threaded rod 76a is rotated. However, an electromechanical brake 78a is coupled to the threaded rod 76a to hold it in position. The brake 78a releases the rod 76a when power is supplied to it. Limit switches 86a and 88a, as shown in FIG. 5, prevent the carriage 70a from being driven too far in either direction by stopping rotation of the threaded rod 76a. The limit switch 86a prevents the carriage 70a from moving too far towards the inward direction, and the carriage 70a is prevented from moving too far in the outward direction in the case of limit switch 88a.

As shown in FIG. 3, each of the stations 52a–52o has a respective interface portion 80a–80o including a respective male electrical connector 82a–82o, preferably a Test-X® connector and a respective friction plate 84a–84o, preferably a SEPAC No. 31354. Typically, each of the stations 52a–52o is separated by a distance of approximately twelve inches. The distance is determined by the accuracy required for the component being measured.

The arrangement of the checking fixture 50 allows the use of a single drive assembly 54, shown in FIGS. 2, 3, 4, and 6, to drive a plurality of stations 52a–52o into position. In an alternative embodiment, the group of stations 52a–52o could be subdivided into groups of modules where each module is serviced by one of a plurality of drive assemblies. The ratio of stations to drive assemblies is chosen based on the balance between the economic savings derived from using less drive assemblies and the reduction in fixture set-up time realized when using more drive assemblies. By using a single drive assembly to service a plurality of stations, the fixture 50 will be lightweight and cost less. Further, the overall space required by the fixture 50 is significantly reduced when using fewer drive assemblies because significant supplemental space is required for servomotors and control panels used to support the drive assembly. For simplicity, the contour-checking fixture 50 illustrates the use of the single drive assembly 54.

Figure 6:
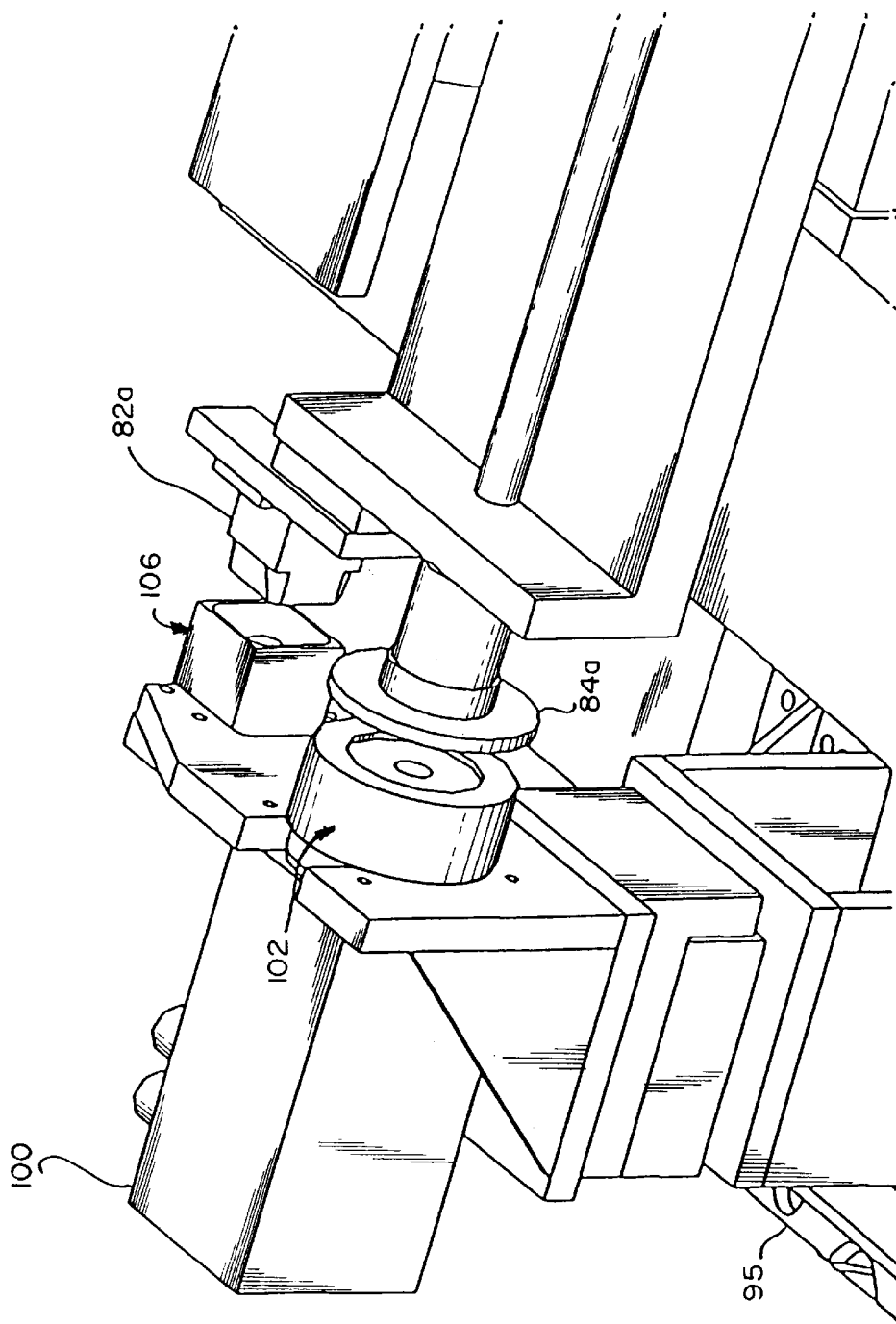
FIG. 6 is an expanded view of the drive assembly and interface of one of the stations of the automatically reconfigurable contour checking fixture of the first embodiment.

The drive assembly 54, shown in FIGS. 4 and 6, includes an X-axis motor 94 which moves a shuttle, upon which the drive assembly 54 is mounted, from station to station by sliding the shuttle 95 along rail 96. A shuttling drive means (not shown) as is well known in the art, such as a threaded rod and nut assembly, a series of gears, or a chain and sprocket assembly is used to engage the X-axis motor 94 with the shuttle 95. Encoder feedback is used to ensure that the drive assembly 54 is positioned precisely in front of a selected one of the interface portions 80a–80o and, more particularly, is aligned with one of the friction plates 84a–84o and one of the corresponding male electrical sockets 82a–82o. An engagement portion of the drive assembly 54 is initially zeroed at an X-home limit switch 98 and then driven to a desired location along the length of the rail 96 (X-axis). The engagement portion of the drive assembly 54 includes a Y-axis motor 100 mounted on the shuttle 95 and used to drive, in the case of station 52a, the carriage 70a of the positioning table 72a to a desired location. The driving action positions the artificial template member 60a to the appropriate place in space. A shaft of the motor 100 is coupled to an electromagnetic friction clutch 102, preferably a SEPAC No. 30053, which engages, in the case of station 52a, the friction plate 84a. The engagement portion of the drive assembly 54 also includes a female socket 106 having a series of male spring-loaded contact pins to contact the male socket 82 having a series of female spring-loaded contact pins to supply power to the electromagnetic brake 78a and enable the overtravel limits 86a and 88a and the Y-axis home proximity sensor 116a. The entire engagement portion is also mounted on a pneumatic slide 104, shown in FIG. 3, to push the engagement portion of the drive assembly 54 towards the interface 80a. The pneumatic slide 104 is triggered by a pneumatic solenoid (not shown), as is well known in the art. Once the air solenoid is energized, the female socket 106a and male socket 82a engage and the friction clutch 102 engages the friction plate 84a. Power is then applied to the friction clutch 102 to magnetically lock the plates. This process is identical for each of the stations 52a–52e.

Figure 7:
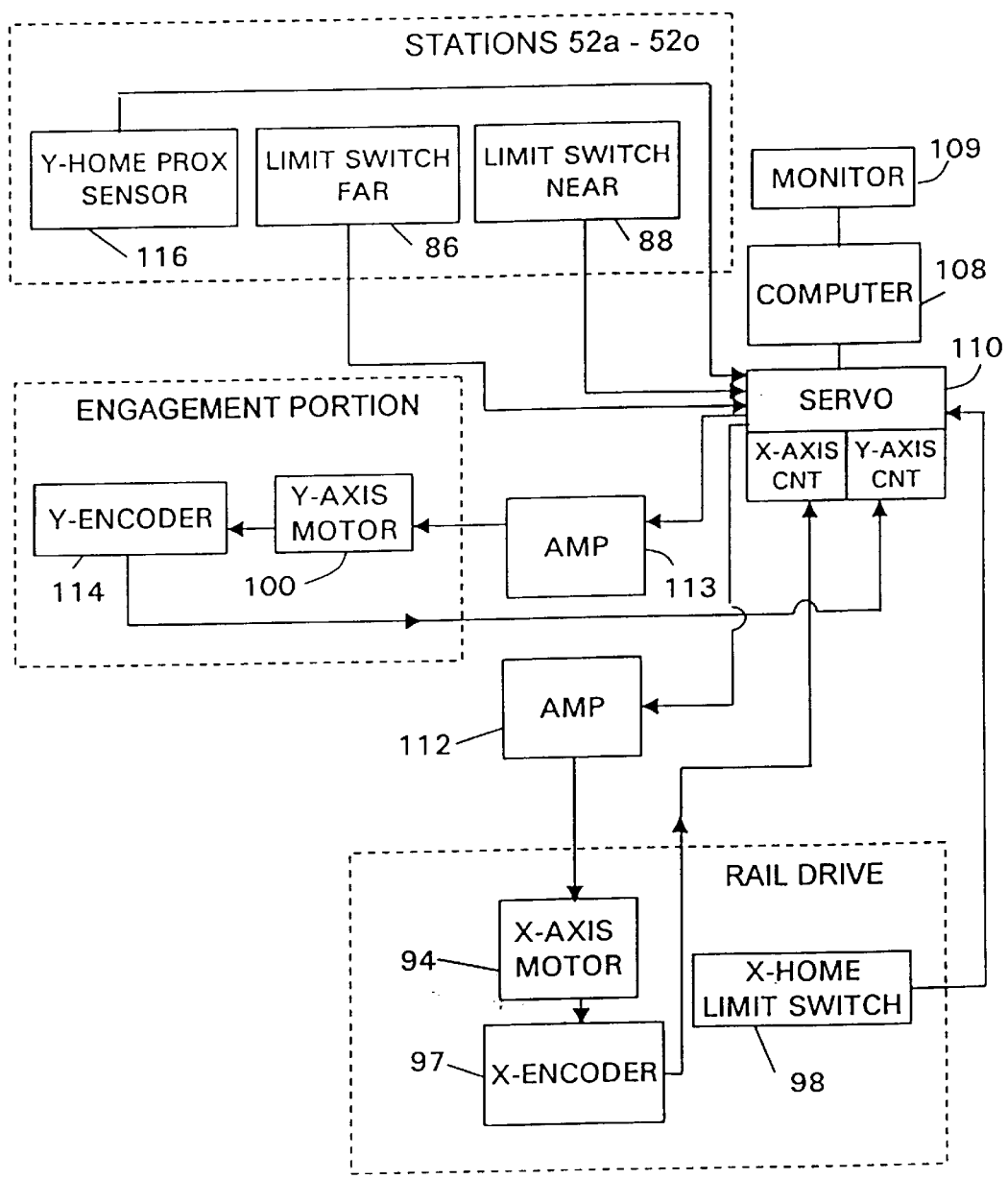
FIG. 7 is an electrical schematic of an amplifier, servo, and motor of the drive assembly of the automatically reconfigurable contour checking fixture of the first embodiment.

The drive assembly electrical system is shown in FIG. 7, and includes a computer 108, programmed with instructions to drive each of the stations 52a–52o a predetermined amount so that the artificial template members 60a–60o are positioned in space to correspond to a contour template for a particular type of component. The computer 108 has a monitor 109 for displaying instructions and status for the fixture 50. The computer 108 is in communication with a servo 110 having an X-axis controller and a Y-axis controller. The X-axis controller of the servo 110 is in electrical communication with the X-axis motor 94 via an amplifier 112. The engageable portion of the drive assembly 54 includes an X-axis encoder 97 to let the servo 110 know, via a closed loop system, when the engageable portion of the drive assembly 54 is in position. The X-home limit switch 98 is also connected to the servo 110.

Once the engageable portion of the drive assembly 54 is coupled to one of the interfaces 80a–80o of one of the respective stations 52a–52o, then the servo 110 is in electrical communication with the Y-axis motor 100 via the amplifier 113. A Y-axis encoder 114 is in communication with the Y-axis motor 100, and reports to the servo 110, in a closed loop system, the position of the station currently being driven.

Each of the stations 52a–52o has the near and far limit switches 86 and 88 to shut down operation of the motor and prevent damage from overreach. In a preferred embodiment, each of the stations 52a–52o also has a station proximity sensor 116 coupled to the servo 110, to zero the servo 110, providing a more accurate placement of the artificial template members.

The contour checking fixture 50 is operated in the following manner. Initially, the drive assembly is driven to the X-home limit switch 98 to home the assembly 54 along the X-axis. The computer 108 directs the engagement portion of the drive assembly 54 to a particular one of stations 52a–52o with a command to the X-axis motor 94. Next, the computer 108 activates the pneumatic solenoid to slide the engagement portion of the assembly 54 forward to a position contiguous with one of the friction plates 84a–84o corresponding to the selected station. Enough pressure is applied to couple the corresponding one of female sockets 106a–106o into a respective one of male sockets 82a–82o. Once an electrical connection is made between the respective sockets, power is supplied to the Y-axis motor 100 and to the corresponding one of electromagnetic brake assemblies 78a–78o, releasing the corresponding one of threaded rods 76a–76o and allowing the corresponding one of carriages 70a–70o to be driven to a desired position. The encoder 114 within the closed-loop system indicates to the servo 110 when the selected one of carriages 70a–70o and hence the respective one of artificial template members 60a–60o has reached a desired position. When the desired position has been reached, the brake assembly 78 is de-energized, causing the threaded rod 76 to fix at its present position. The electromagnetic friction clutch 102 is deactivated and the pneumatic slide 104 is retracted by de-energizing the pneumatic solenoid. When the slide is retracted, the electrical sockets 82 and 106 are disconnected. Then, the assembly 54 is driven by the computer 108 to the next selected station 52.

In the first embodiment, the computer 108 is controlled by software that is stored as a series of program instructions in a memory of the computer 108 to perform the above-described operation for each of the artificial template members 60a–60o so that they correspond to a selected contour template. Flow charts, from which source code can be written by one skilled in the art, are illustrated in FIGS. 8a and 8b.

Figure 8A:
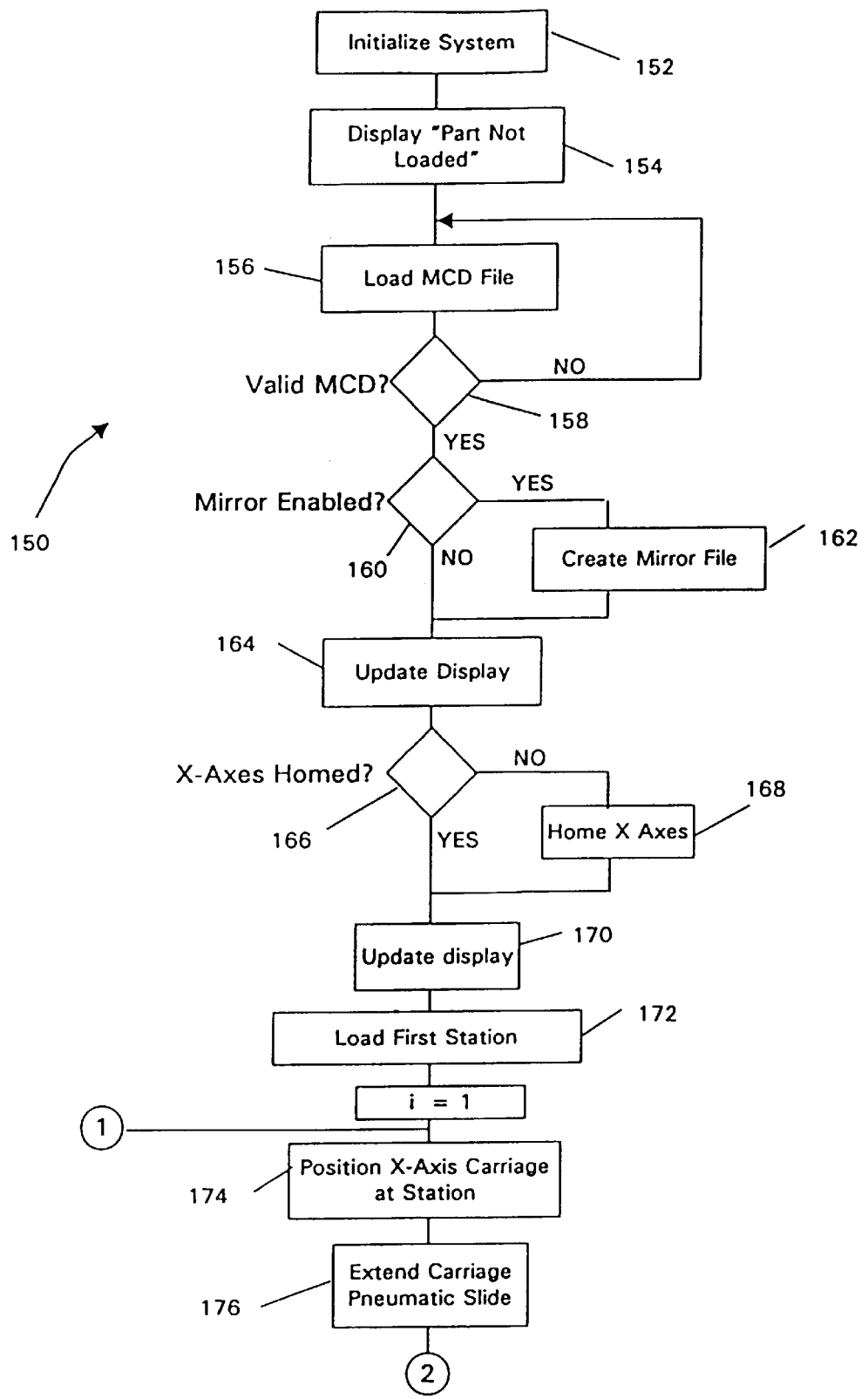
FIGS. 8A and 8B are flow charts showing the main routine performed by a computer during operation of the automatically reconfigurable contour checking fixture of the first embodiment.
Figure 8B:
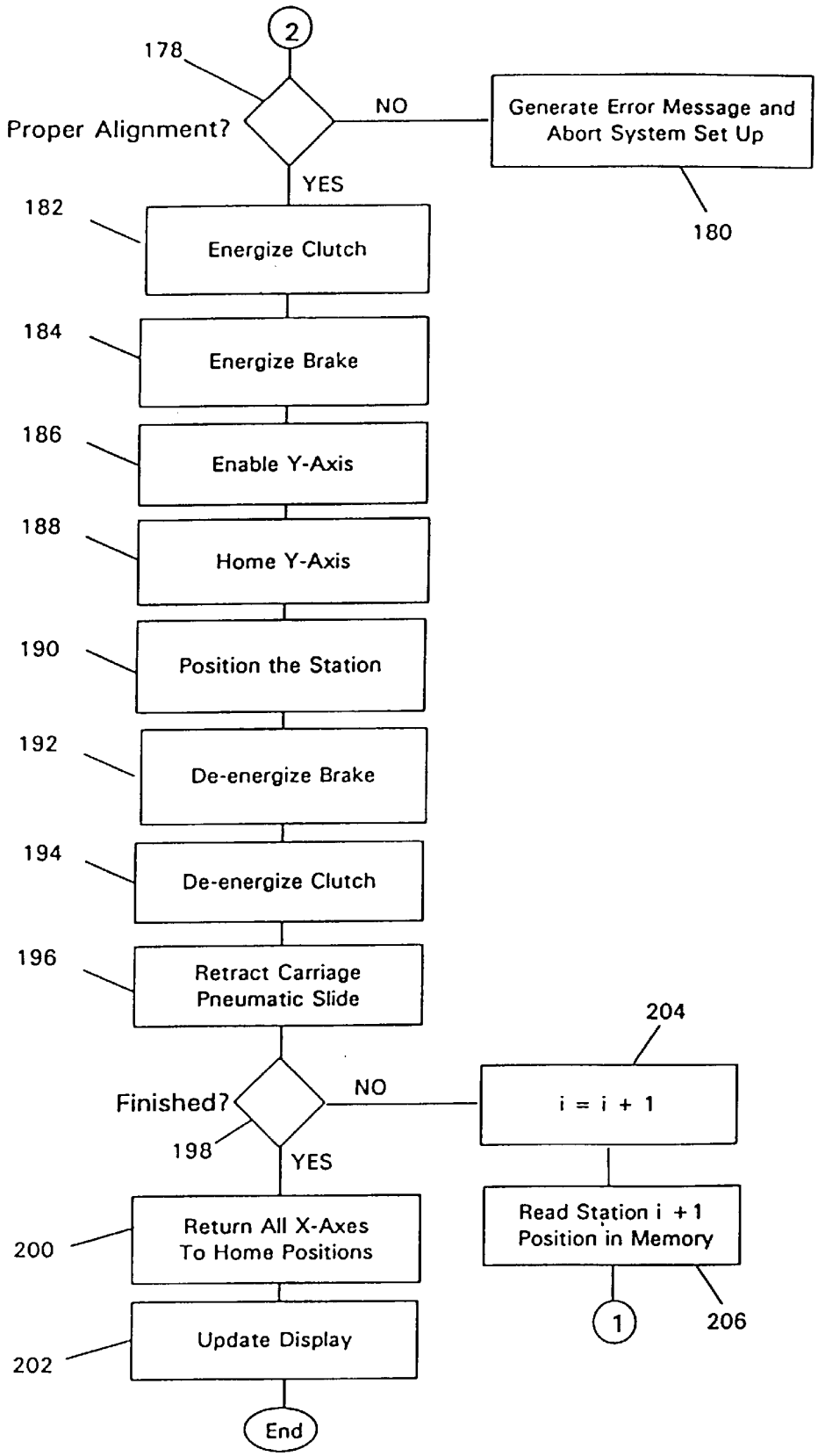

Referring to FIGS. 8a and 8b, a main routine 150, which is executed by the computer 108, begins in step 152 by initializing the system. In step 154, the computer displays on the monitor 109 the phrase "part not loaded" and proceeds to step 156. In step 156, the computer 108 loads a selected MCD file in response to an operator's selection of a function "GET PART" from a menu displayed on the monitor 109. The MCD (machine control data) file describes the specific contour dimensions of a selected component to a numerically-controlled device. Prior to the selection of the MCD file, the operator also selects the specific type of component to be fixtured. Next, in step 158, the computer 108 checks to see if the MCD file is valid. If the MCD file is valid, then the computer 108 proceeds to step 160; however, if the computer 108 determines that the MCD file is not valid, it reloads the MCD file by returning to step 156.

In step 160 of the main routine 150, the computer 108 determines whether a mirror function has been enabled. If it has, the computer 108 calculates a mirror file which creates a contour profile for an opposite hand counterpart to the current MCD file, as is well-known in the art, by proceeding to step 162. However, if the mirror function has not been chosen in step 160, the computer 108 proceeds directly to step 164 and updates the display on monitor 109 to display "part not set up." In step 166, the computer 108 determines whether the X-axis of the rail drive portion of the drive assembly 54 has been homed. If the X-axis has not been homed, i.e. the X-home limit switch 98 is not detecting the presence of the engageable portion, then the servo 110 is directed to drive the engageable portion to the zero position until the first X-axis home limit switch 98 has been triggered. If the computer 108, in step 166, determines that the X-axis has been homed, it then proceeds to step 170 and updates monitor 109 by displaying "set-up in process."

Next, the computer 108 proceeds to step 172 and loads the position data corresponding to the first station. This data is loaded into memory and then the computer 108 proceeds to step 174. In step 174, the computer 108 moves the engageable portion of the drive assembly 54 along the X-axis, i.e. the rail 96, by driving the shuttle 95 along the rail 96 until the friction clutch 102 and the Y-axis servo motor 100 are aligned with the selected station. The computer 108 then proceeds to step 176. In step 176, the computer 108 energizes the pneumatic solenoid, causing the pneumatic slide 104 to move the engageable portion including the electromagnetic friction clutch 102 and spring-loaded female connector 106 to engage the friction plate 84 and the male connector 82 of the selected station. The computer 108 then proceeds to step 178, shown in FIG. 8B, where it determines whether the male and female electrical connectors as well as the friction plate 84 and the clutch 102 have been properly mated. If proper alignment has not occurred, then the computer 108 proceeds to step 180 and generates an error message "abort system set-up" on monitor 109. However, if the electrical connectors as well as the friction plate 84 and clutch 102 have been properly aligned, then the computer 108 proceeds to step 182. In step 182, the computer 108 energizes the friction clutch 102 to firmly engage it with the friction plate 84 and thus the selected one of threaded rod 76a–76o of the respective selected stations 52a–52o. Next, the computer 108 proceeds to step 184, where it energizes and thereby releases the electromagnetic brake 78, allowing the threaded rod to be rotated.

Next, in step 186, the computer 108 enables the Y-axis motor 100 and proceeds to step 188, where the computer 108 homes the position of the selected station by driving the carriage of the selected station inward until the station Y-axis home proximity sensor 116 of the selected station is activated. In step 190, the computer 108 positions the selected one of the stations 52a–52o by recalling the desired position of the carriage 70 from memory and then driving the Y-axis motor 100 in the closed-loop system, including the servo 110, and amplifier 113, until the Y-encoder 114 detects that the desired position of the carriage has been reached. The computer 108 then proceeds to step 192 and de-energizes the electromagnetic brake 78, causing it to lock the carriage in position. Next, in step 194, the computer 108 de-energizes the electromagnetic friction clutch 102, allowing the engagement portion of the drive assembly 54, including the shuttle 95, to disengage from the selected one of the stations 52a–52o. Then, in step 196, the computer 108 de-energizes the pneumatic solenoid, causing the pneumatic slide 104 to reposition the engageable portion of the drive assembly 54 to a point where it is freely movable along the rail 96.

In step 198 of routine 150, the computer 108 checks to determine whether any other stations need to be repositioned. If no further stations need to be repositioned, then the computer 108 proceeds to step 200 and returns the engageable portion of the drive assembly 54 to its home position and then proceeds to step 202, where it updates the display on monitor 109 to read "set-up complete." However, if the computer 108, in step 198, determines that not all of the stations 52a–52o have been positioned, then the computer 108 proceeds to step 204 and increments the station to be selected by one and then proceeds to step 206 and reads from memory the desired position of the next station. Then, the computer 108 returns to step 174 and repeats the previously described steps of positioning the Y-axis and engaging the engageable portion of the drive assembly 54. This process continues until all of the stations 52a–52o have been properly positioned and locked into place.

Figure 9:
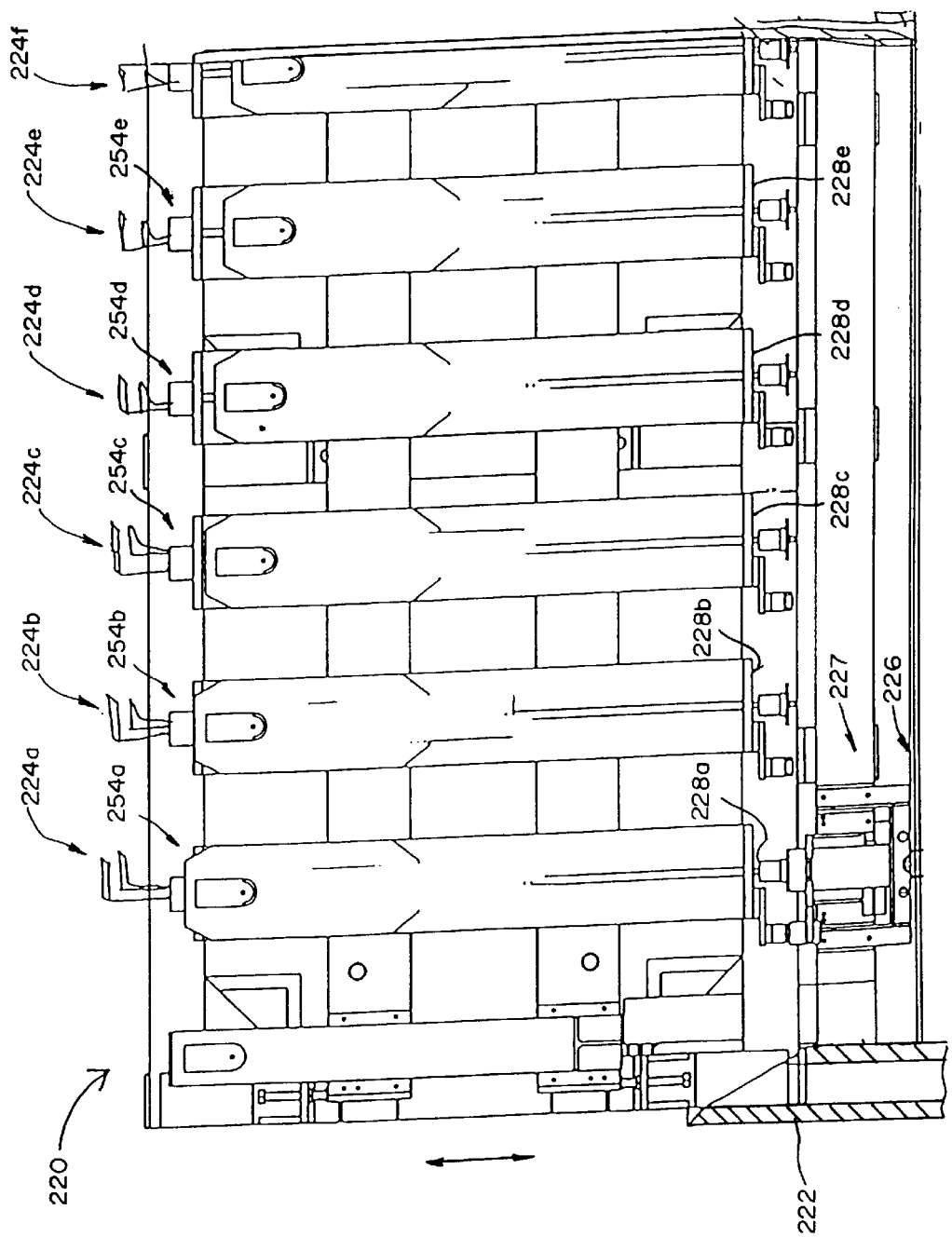
FIG. 9 is a fixture to hold components in place for assembly as a second embodiment of the present invention.

In a second embodiment of the present invention, the construction of the first embodiment is arranged to form an automatically adjustable fixture for holding a plurality of sub-components which make up a component to be assembled. As shown in FIG. 9, the adjustable fixture 220 includes a base 222 stabilized at a designated position and arranged to hold each of stations 254a–254e in a vertical orientation. The stations 254a–254e act as movable positioning devices, and are located at intervals along the base 222. Each of the stations/positioning devices 254a–254e has a respective one of holding devices 224a–224e structured to hold at least one of the sub-components relative to at least one other of the sub-components, while still allowing assembly of the entire component by a device such an NC machine (not shown). The holding device may be a mechanical clamping device, an adhesive device, a nut-and-bolt assembly, a pneumatic device, or any other such holding device known in the art.

The second embodiment, as in the first embodiment, includes a drive assembly selectively engageable to each of the movable positioning devices/stations 254a–254e to move the respective holding device 224a–224f to a predetermined position. The fixture 220 for holding sub-components also includes a shuttle 226 positioned below each of the stations 254a–254f and movable along the base 202. The shuttle 226 supports the drive assembly 227 and positions the engageable portion of the drive assembly contiguous with each drive interface 228a–228e of the stations 254a–254e, as discussed in the first embodiment.

Figure 10:
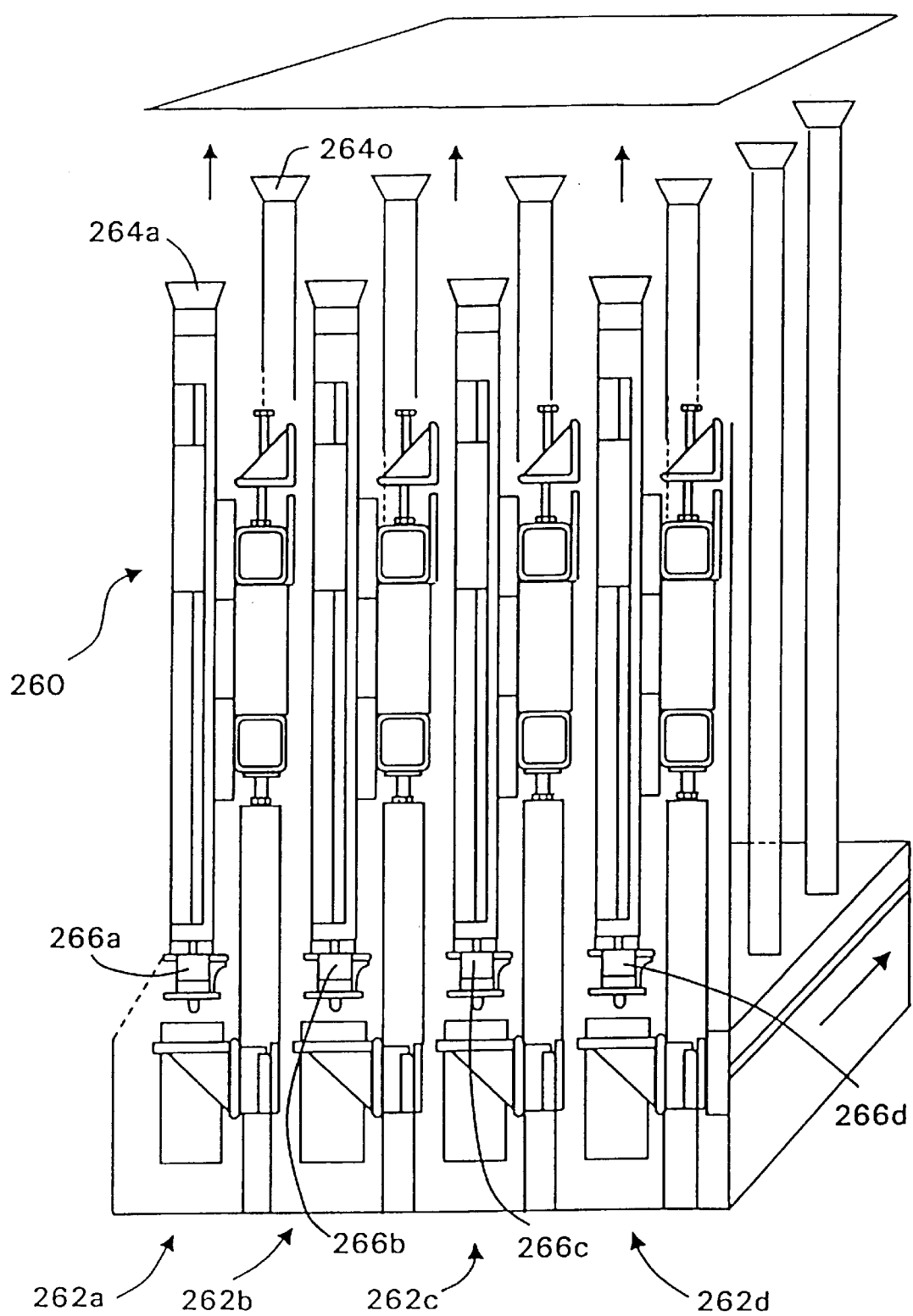
FIG. 10 is a fixture for holding a specially shaped panel at a predetermined position as a third embodiment of the present invention.

In a third embodiment of the present invention, a universal panel support fixture 260 supports a variety of panels having different contours, shapes, and sizes. The fixture 260, shown in FIG. 10, includes a plurality of the bases 262a–262d, such as the base 222 of the second embodiment. Each of the bases 262a–262d is physically connected to form a matrix of movable positioning devices/stations 264a–264o by 262a–262d bases located at intervals along the length and the width of the support fixture 260. Each of the positioning devices/stations includes a support device adapted to firmly support and hold a portion of the panel in a predetermined position. Each of the plurality of movable positioning devices 264a–264o along each of bases 262a–262d includes a drive interface. The universal panel support fixture includes a plurality of drive assemblies 266a–266d, each selectively engageable to groups of movable positioning devices for moving each of the positioning devices 264a–264o in each of the bases 264a–264d to a selective position. Preferably, a plurality of shuttles, each move relative to a respective one of the bases 264a–264d. Each of the shuttles supports one of the plurality of engageable portions of the drive assemblies 266a–266d and selectively moves its respective one of the drive assemblies 266a–266d to a position contiguous with a drive interface of one of the movable positioning devices 264a–264o, as discussed in the first and second embodiments.

With the present invention, a flexible inexpensive fixturing system is possible to support a variety of work pieces within a machining environment.

While such advantages are apparent from the foregoing disclosure, it will be understood, however, that various changes in the details, materials and arrangement of parts which have been herein described and illustrated in order to explain the nature of the invention may be made by those skilled in the art within the principle and scope of the invention as expressed in the appended claims.

What is claimed is:

1. An automatically adjustable fixture for holding a plurality of sub-components that form a component to be assembled, said fixture comprising:

a base stabilized at a designated position;

a plurality of movable positioning devices located at intervals along said base, each of said positioning devices including a holding device structured to hold at least one of said sub-components relative to at least one of another of said sub-components, while allowing the assembly of said component, and a drive interface; and a drive assembly selectively engageable to each of said movable positioning devices to move said holding device to a predetermined position.

2. The fixture according to claim 1, further including:

a shuttle movable relative to said base and supporting said drive assembly, said shuttle positioning said drive assembly contiguous to said drive interface of a selected one of said plurality of positioning devices.

3. A universal panel support fixture for supporting a variety of panels having different contours, shapes, and sizes, said fixture comprising:

a base having a length and width, said base held stationary at a designated position;

a plurality of movable positioning devices located at intervals along said length and said width of said base, each of said positioning devices including a support device adapted to firmly support and hold a portion of said panel in a predetermined position, wherein each of said plurality of movable positioning devices further includes a drive interface; and a plurality of drive assemblies, each selectively engageable to groups of movable positioning devices for moving each of said positioning devices in each of said groups to a selected position.

4. The fixture according to claim 3, further including:

a plurality of shuttles, each movable relative to a respective one of said groups of movable positioning devices, each of said shuttles supporting one of said plurality of drive assemblies and selectively moving said one of said drive assemblies to a position contiguous with said drive interface of one of said movable positioning devices.

5. An automatically reconfigurable contour checking fixture for comparing a component to a programmed contour, said fixture comprising:

a support table, having a length and width, wherein a drive rack runs along its length;

a plurality of stations positioned at intervals along the length of said support table, each of said stations including:
  a movable member having:
    an artificial template member for fixing at a designated point alone a programmed contour; and
    a pressure member; and
  a positioning table slidably engaged to said support table to be movable along the width of said support table:

a multi-service drive assembly which drives said artificial template member of each of said plurality of stations to a respective designated point along said programmed contour; and a computer in communication with said multi-service drive assembly, communicating positional instructions such that said artificial template member of each of said plurality of stations conforms to said programmed contour.

6. The fixture according to claim 5 wherein said pressure member includes:
  a base having a track;
  a sliding member slidably coupled to the base; and
  a pneumatic device including a pneumatic piston coupled to said sliding member for moving said sliding member relative to said artificial template member.

7. The fixture according to claim 6, wherein said positioning table comprises:
  a carriage coupled to said movable member;
  a threaded rod threadingly engaged to said carriage;
  a housing slidably supporting said carriage, wherein rotation of said threaded rod will cause said carriage to move relative to said housing along the width of said horizontal support;
  a friction plate interface fixed to an and of said threaded rod to assist in rotating said threaded rod; and
  a female electrical connector mounted adjacent said friction plate and connected to said brake electrically.

8. The fixture according to claim 7, wherein said positioning table further comprises a brake removably engaged to said threaded rod to hold said threaded rod stationary unless supplied with electrical power.

9. The fixture according to claim 8, wherein said positioning table further comprises an overreach limit switch fixed to said housing which is triggered when said carriage is driven beyond an overreach position on said housing.

10. The fixture according to claim 9, wherein said positioning table further comprises an under-reach limit switch fixed to said housing which is triggered when said carriage is driven beyond an under-reach position on said housing.

11. The fixture according to claim 10, wherein said positioning table further comprises a proximity sensor fixed to said housing and detects when said carriage has reached a home position for purposes of calibration.

12. The fixture according to claim 11, wherein said drive assembly including:
  drive engagement device which selectively engages a selected one of the stations;
  a rail movement device which moves the drive engagement device along said rail; and
  a control system for controlling the movement of the drive engagement device and the rail movement device.

13. The fixture according to claim 12, wherein said rail movement device comprises:
  an X-axis motor fixed to an end of said drive rack that drives said drive engagement device to a position along said rack; and
  a carrier slidably coupled to said drive rack and engaged to said drive engagement device to move said drive engagement device along said rack upon movement of said X-axis motor.

14. The fixture according to claim 13, wherein said drive engagement device comprises:
  a Y-axis motor coupled to said carrier having a rotatable shaft;
  an electromagnetic clutch mounted at an end of said rotatable shaft and selectively coupled to said friction plate;
  a spring loaded male electrical connector mounted adjacent said electromagneic clutch and supplying electrical power; and
  a pneumatic shifting device mounted between said carrier and said or and said spring-loaded male electrical connector, wherein in one position said shifting device allows said Y-axis motor to move a long said rack, and when a second position said electromagnetic clutch is forced against said friction plate, said male electrical connector is forced to engage said female electrical connector.

15. The fixture according to claim 14, wherein said control system comprises:
  an X and Y-axis servo that sends a first signal to said X-axis motor and a second signal to said Y-axis motor, wherein said first signal gives said X-axis motor to move said carrier to a designated station along said rack, and said second signal drives said Y-axis motor to rotate said threaded rod until said artificial template member is positioned to said designated point along said programmed contour; and
  an amplifier electrically connected between said X and Y axis servo and said X axis motor and said Y axis motor to amplify said first and second signal.

* * * * *